US009478094B2

(12) United States Patent
Sievel et al.

(10) Patent No.: US 9,478,094 B2
(45) Date of Patent: Oct. 25, 2016

(54) POSTAL SERVICES KIOSK HAVING PAYMENT CARD SECURITY

(75) Inventors: Mark E. Sievel, Newtown, CT (US); Christopher S. Kallas, Monroe, CT (US); Joseph P. Tokarski, Prospect, CT (US); Nirav I. Pravasi, Naugatuck, CT (US)

(73) Assignee: Pitney Bowes Inc., Stamford, CT (US)

( * ) Notice: Subject to any disclaimer, the term of this patent is extended or adjusted under 35 U.S.C. 154(b) by 1694 days.

(21) Appl. No.: 12/648,525

(22) Filed: Dec. 29, 2009

(65) Prior Publication Data

US 2011/0161231 A1 Jun. 30, 2011

(51) Int. Cl.
*G07F 17/26* (2006.01)
*G06Q 20/20* (2012.01)
*G06Q 20/36* (2012.01)
*G06Q 20/40* (2012.01)
*G07F 17/00* (2006.01)

(52) U.S. Cl.
CPC ............. *G07F 17/26* (2013.01); *G06Q 20/204* (2013.01); *G06Q 20/367* (2013.01); *G06Q 20/40* (2013.01); *G07F 17/0014* (2013.01)

(58) Field of Classification Search
CPC ........... G06Q 20/382; G06Q 2250/05; G06Q 2220/00; G06F 2221/2143
USPC ........................................................ 705/64
See application file for complete search history.

(56) References Cited

U.S. PATENT DOCUMENTS

| | | |
|---|---|---|
| 4,024,380 A | 5/1977 | Gunn |
| 4,868,757 A | 9/1989 | Gil |
| 4,900,905 A | 2/1990 | Pusic |
| 4,901,241 A | 2/1990 | Schneck |
| 4,923,022 A | 5/1990 | Hsieh |
| 4,940,887 A | 7/1990 | Sheng-Jung |
| 5,025,386 A | 6/1991 | Pusic |
| 5,065,000 A | 11/1991 | Pusic |
| 5,233,532 A | 8/1993 | Ramsden |
| 5,272,640 A | 12/1993 | Wu |
| 5,313,404 A | 5/1994 | Wu |
| 5,340,948 A | 8/1994 | Ramsden |

(Continued)

FOREIGN PATENT DOCUMENTS

WO WO 02/061534 A2 8/2002

*Primary Examiner* — Rutao Wu
*Assistant Examiner* — Monica Mandel
(74) *Attorney, Agent, or Firm* — Brian A. Lemm; Charles R. Malandra, Jr.; Steven J. Shapiro

(57) ABSTRACT

An apparatus for facilitating payment using a payment card includes a computerized sales transaction device structured to determine a monetary amount for a sale, and a secure card activated terminal (CAT) device in electronic communication with the computerized sales transaction device. The computerized sales transaction device sends the monetary amount to the secure CAT device. The secure CAT device is structured to: (i) obtain sensitive payment card information from the card, (ii) automatically request in a secure, encrypted manner authorization for the sale using the monetary amount and the sensitive payment card information, (iii) receive in a secure, encrypted manner authorization approval for the sale, and (iv) in response to receiving the authorization approval, send purchase authorization approval information to the computerized sales transaction device. The computerized sales transaction device never receives the sensitive payment card information.

16 Claims, 2 Drawing Sheets

(56) References Cited

U.S. PATENT DOCUMENTS

| | | |
|---|---|---|
| 5,365,044 A | 11/1994 | Hesshaus |
| 5,369,258 A | 11/1994 | Sansone et al. |
| 5,457,636 A | 10/1995 | Sansone et al. |
| 5,481,464 A | 1/1996 | Ramsden |
| 5,586,037 A | 12/1996 | Gil et al. |
| 5,656,799 A | 8/1997 | Ramsden et al. |
| 5,826,246 A | 10/1998 | Bator et al. |
| 5,933,812 A * | 8/1999 | Meyer et al. .............. 705/15 |
| 5,970,150 A * | 10/1999 | Sansone ..................... 380/51 |
| 6,477,514 B1 | 11/2002 | Gil et al. |
| 7,076,329 B1 | 7/2006 | Kolls |
| 7,988,060 B2 * | 8/2011 | Killian et al. ............ 235/492 |
| 2002/0035538 A1 | 3/2002 | Moreau |
| 2002/0147913 A1 * | 10/2002 | Lun Yip ..................... 713/184 |
| 2003/0004876 A1 * | 1/2003 | Jacobson ..................... 705/41 |
| 2004/0204082 A1 * | 10/2004 | Abeyta ........................ 455/557 |
| 2005/0086164 A1 * | 4/2005 | Kim et al. ..................... 705/40 |
| 2005/0127165 A1 * | 6/2005 | Currey ........................ 235/380 |
| 2007/0084913 A1 * | 4/2007 | Weston ........................ 235/380 |
| 2007/0299555 A1 | 12/2007 | Walker et al. |
| 2008/0091544 A1 * | 4/2008 | Linlor .......................... 705/17 |
| 2008/0099552 A1 * | 5/2008 | Grillion ...................... 235/380 |
| 2008/0114699 A1 * | 5/2008 | Yuan et al. ................... 705/78 |
| 2009/0090783 A1 * | 4/2009 | Killian et al. ............. 235/492 |
| 2009/0094123 A1 * | 4/2009 | Killian et al. ............... 705/16 |
| 2009/0094125 A1 * | 4/2009 | Killian et al. ............... 705/17 |
| 2009/0266884 A1 * | 10/2009 | Killian et al. ............ 235/380 |

* cited by examiner

POSTAL SERVICES KIOSK HAVING PAYMENT CARD SECURITY

FIELD OF THE INVENTION

The present invention relates to kiosks in which payments can be made using payment cards, such as credit or debit cards, and in particular to a postal services kiosk having payment card security for processing payments using payments cards that simplifies compliance with data security requirements and standards relating to payment cards.

BACKGROUND OF THE INVENTION

Payment cards, such as credit or debit cards, are commonly used for payment in a variety of transactions. For example, payments are often made for purchases in association with a point-of-sale (POS) computer system of a retailer such as a supermarket. In addition, vending kiosks are small, stand alone structures that are employed to deliver a number of different products to a consumer with payment being made via cash or payment card. One type of vending kiosk is a postal services kiosk, wherein a customer is able to purchase postage and then post mail in a convenient fashion. Such kiosks are typically designed to weigh the mail, inform the user as to the amount of postage due and, upon user acceptance and payment, dispense the postage.

The Payment Card Industry Security Standards Council (PCISSC) is an organization comprised of a number of major credit card companies that sets standards aimed at limiting theft related to fraudulent acquisition and use of payment card data. Such theft is most often the result of data breaches at merchants that accept payment cards. In these cases, sensitive data, which includes the full payment card account number, cardholder name and card expiration date, has been fraudulently obtained. As a result, the PCISSC has established what are known as Data Security Standards (DSS). The key requirements of DSS include: (1) building and maintaining a secure network, including a firewall configuration, (2) protecting cardholder data while stored and transmitted across open public networks using encryption technology, (3) maintaining a vulnerability management program including using and updating anti-virus software, (4) implementing strong access control measures that restrict access to cardholder data, (5) regularly monitoring and testing networks, and (6) maintaining an information security policy. These standards involve physical and cryptographic security around the data and systems that accept and process payment card data, are very restrictive and both difficult and costly to implement, particularly for kiosk systems that may be in environments that are not monitored and not physically secure.

Thus, there is a need for systems and methods for processing payments using payments cards that simplify compliance with data security requirements and standards relating to payment cards such as the PCI-DSS requirements.

SUMMARY OF THE INVENTION

In one embodiment, an apparatus for facilitating payment for goods or services using a payment card, such as a credit card or a debit card, is provided that includes a computerized sales transaction device, such as a vending kiosk (e.g., a postal kiosk) or a POS terminal, structured to determine a monetary amount for a sale of particular goods or services, and a secure card activated terminal (CAT) device in electronic communication with the computerized sales transaction device. The computerized sales transaction device is structured to electronically send the monetary amount for the sale to the secure CAT device. The secure CAT device is structured to: (i) securely obtain sensitive payment card information (e.g., a full account number, a cardholder name and a card expiration date associated with the payment card) from the payment card, (ii) automatically request in a secure, encrypted manner authorization for the sale from a third party using the determined monetary amount and the obtained sensitive payment card information, (iii) receive in a secure, encrypted manner authorization approval for the sale from the third party, and (iv) in response to receiving the authorization approval, electronically send purchase authorization approval information to the computerized sales transaction device. The computerized sales transaction device never receives the sensitive payment card information. As a result, the secure CAT device is able to comply with certain predetermined security requirements relating to the security of payment card information (such as PCI-DSS requirements) and the computerized sales transaction device does not need to compy with the predetermined security requirements.

In another embodiment, a method of facilitating payment for goods or services using a payment card is provided that includes determining a monetary amount for a sale of goods or services in a first device, electronically sending the monetary amount for the sale to a second device coupled to the first device, the second device being a secure device, securely obtaining sensitive payment card information from the payment card in the second device, automatically requesting in the second device in a secure, encrypted manner authorization for the sale from a third party using the determined monetary amount and the obtained sensitive payment card information, receiving in the second device in a secure, encrypted manner authorization approval for the sale from the third party, and in response to receiving the authorization approval, electronically send purchase authorization approval information from the second device to the first device, wherein the first device never receives the sensitive payment card information.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DETAILED DESCRIPTION OF THE EXEMPLARY EMBODIMENTS

Figure 1:
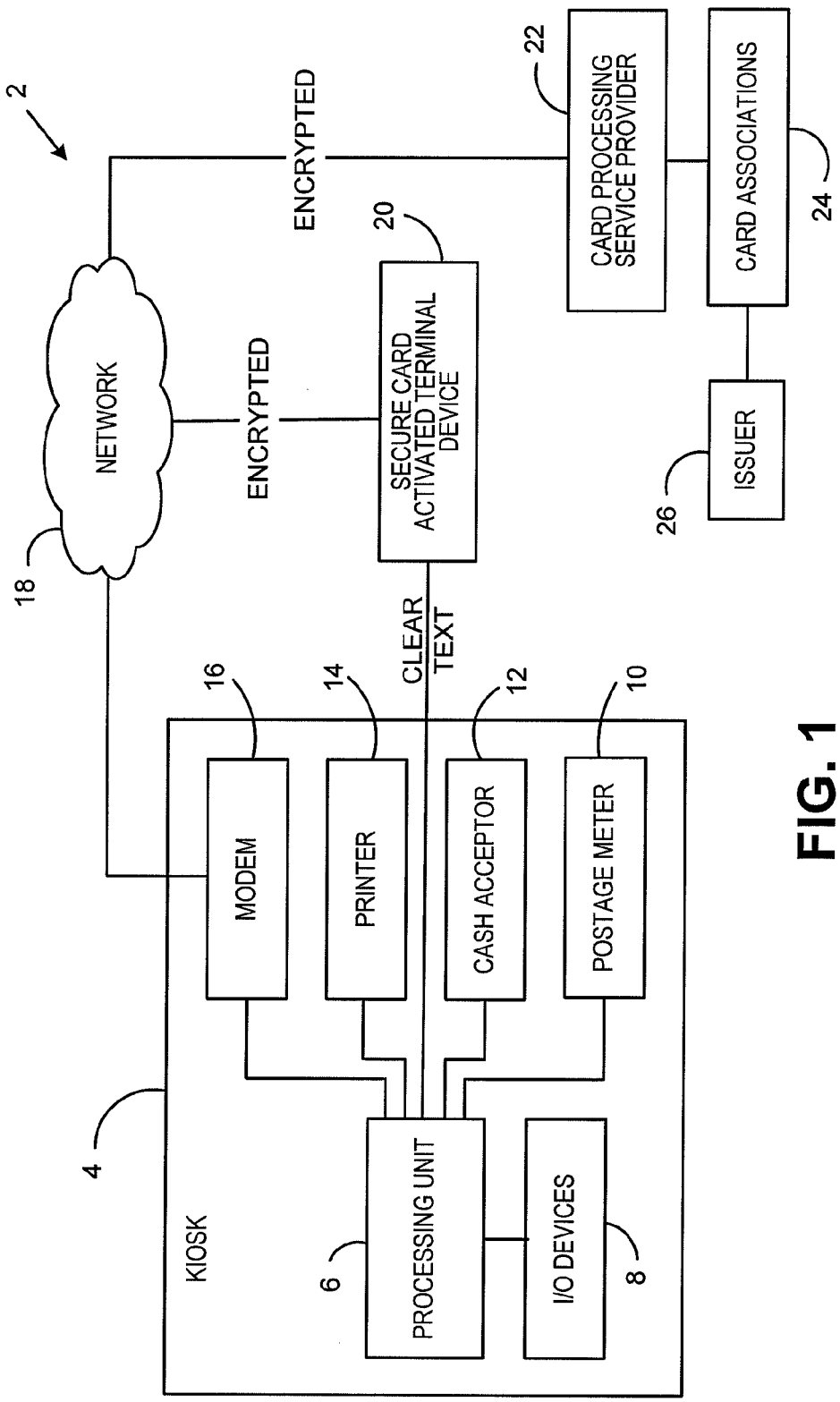
FIG. 1 is a block diagram of a payment processing system according to one embodiment of the invention.

Directional phrases used herein, such as, for example and without limitation, top, bottom, left, right, upper, lower, front, back, and derivatives thereof, relate to the orientation of the elements shown in the drawings and are not limiting upon the claims unless expressly recited therein. As employed, herein, the statement that two or more parts or components are "coupled" together shall mean that the parts are joined or operate together either directly or through one or more intermediate parts or components. As employed herein, the statement that two or more parts or components "engage" one another shall mean that the parts exert a force against one another either directly or through one or more intermediate parts or components. As employed herein, the term "number" shall mean one or an integer greater than one (i.e., a plurality).

FIG. 1 is a block diagram of a payment processing system 2 according to one embodiment of the invention. The payment processing system 2 includes a postal services kiosk 4 for enabling individuals to, among other things, purchase postage and post mail. The postal kiosk 4 includes a processing unit 6, which may include a microprocessor, a microcontroller, or any other suitable processor, which is operatively coupled to a suitable memory for storing routines to be executed by the processing unit 6. Specifically, the memory, which may be separate from and/or internal to the microprocessor, microcontroller or other suitable processor, stores one or more routines for controlling the operation of the postal kiosk 4 to enable it to dispense postage and to implement the methods of operation described in greater detail elsewhere herein. A number of additional components are included within the postal kiosk 4 and operatively coupled to the processing unit 6, including, without limitation, one or more I/O devices 8, such as an LCD display, a keyboard or a touchscreen, for enabling information to be input into and output from the postal kiosk 4, a postage meter 10 for dispensing postage, a cash acceptor 12 for receiving cash payments, a printer 14 to enable the postal kiosk 4 to print items such as postage evidence, customer receipts, and the like, and a modem 16 for enabling the postal kiosk 4 to conduct communications through a network 18, to, for example, download additional postage amounts to the postage meter 10 and/or software upgrades for the processing unit 6. The network 18 may be one or more wired and/or wireless communications networks alone or in various combinations, and may include, without limitation, the Internet.

The payment processing system 2 further includes a secure card activated terminal (CAT) device 20 that is operatively coupled to the processing unit 6 through, for example, a serial interface. The CAT 20 may be, for example, a Personal Identification Number (PIN) Entry Device (PED) that may include a keypad or similar input device, and is structured to capture and encrypt sensitive data, such as, without limitation, a personal identification number or payment card data, wherein the electronic components are housed in a tamper resistant or tamper evident shell. The secure CAT 20 is operatively coupled to the network 18 and is structured to read information, such as the full payment card account number, cardholder name and card expiration date, from payments cards, such as credit and debit cards, and securely transmit that information (in encrypted form) to a card processing service provider 22 through the network 18. As used herein, the term "secure" in reference to the secure CAT 20 shall mean that any attempt to open or otherwise access the content of the secure CAT 20 will result in the secure CAT 20 erasing its cryptographic keys and any cardholder data that it stores. As such, the secure CAT 20 would comply with the current version of the PCI-DSS requirements.

The card processing service provider 22 is a financial institution or other organization that provides payment card processing services to the merchant that operates the postal kiosk 4. The card processing service provider 22 is in communication with one or more card associations 24, each of which is a network, such as VISA® or MasterCard®, that acts as a gateway between the card processing service provider 22 and one or more issuer(s) 26 that issue payment cards to customers.

In operation, a customer interacts with the postal services kiosk 4, through the I/O devices 8, to select the postage and/or other services that are desired. When it comes time to pay for the selected postage and/or other services, the processing unit 6 determines the final monetary amount required for the purchase. If the customer desires to pay using a payment card, the processing unit 6 instructs the customer through the I/O devices 8 (e.g., through an LCD display) to swipe his or her card at the secure CAT 20 to enable the secure CAT 20 to acquire the full payment card account number, cardholder name and card expiration date from the customer's payment card. The processing unit 6 also sends an instruction to the secure CAT 20 (in clear text form) instructing it to do an authorization transaction for the determined monetary value using the obtained payment card information. The secure CAT 20 then autonomously sends a purchase authorization request including the determined monetary value and using the obtained payment card information in an encrypted form to the card processing service provider 22 through the network 18. In response, the card processing service provider 22 will securely determine from the appropriate issuer 26 through the appropriate card association 24 whether the payment card information and the transaction amount are valid. If it is determined that the payment card information and the transaction amount are valid (i.e. they are verified), then a purchase authorization approval (including, for example, a unique authorization number) is securely transmitted from the card processing service provider 22 to the secure CAT 20 through the network 18. The secure CAT 20 will then send, in clear text form, purchase authorization approval information, including, for example, the unique authorization number and the last four digits of the payment card account number, to the postal kiosk 4, which indicates that the customer has successfully paid for the transaction and which may be printed on a customer receipt. The last four digits of the payment card account number are not considered to be sensitive payment card information. The received purchase authorization approval information is then subsequently used by the merchant for clearing, settlement and funding of the transaction through the card processing service provider 22. It is important to note that, during the transaction just described, no sensitive customer information, such as the obtained payment card information, is ever transmitted from the secure CAT 20 to the postal kiosk 4. As a result, the postal kiosk 4 does not need to comply with the PCI-DSS requirements. To put it another way, the postal kiosk 4 is outside of the scope of the PCI-DSS requirements, and only the secure CAT 20 is inside the scope of the PCI-DSS requirements.

Figure 2:
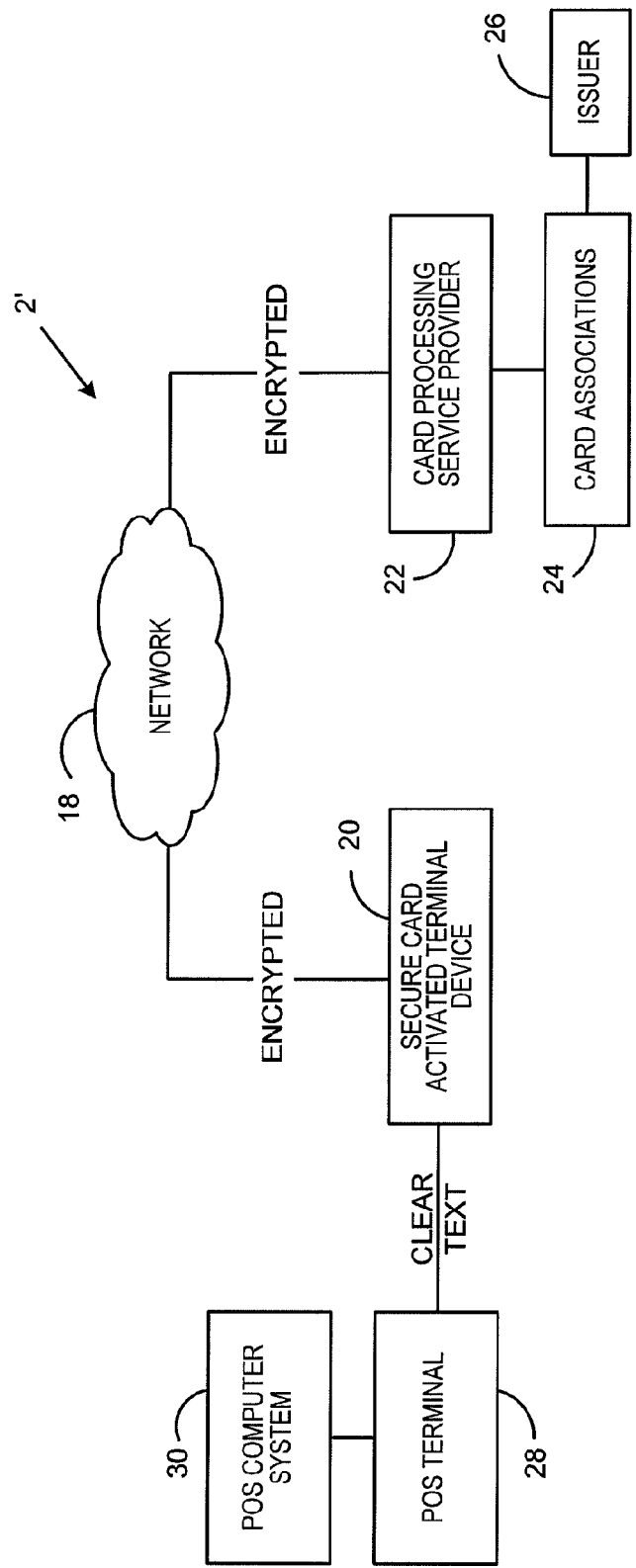
FIG. 2 is a block diagram of a payment processing system according to an alternative embodiment of the invention.

FIG. 2 is a block diagram of a payment processing system 2' according to an alternative embodiment of the invention. The payment processing system 2' is similar to the payment processing system 2 described above, and like components are labeled with like reference numerals. However, rather than a postal kiosk 4, the payment processing system 2' includes a merchant POS terminal 28 that is operatively coupled to the secure CAT 20. The POS terminal 28 is a computerized device that is, among other things, able to read encoded, machine readable information, such as a bar code (e.g., UPC symbol) or RFID tag, provided on products and other items, and may be a cash register system that is commonly found in retailers such as supermarkets. The POS terminal 28 is in electronic communication with a POS computer system 30. The POS computer system 30 may be any type of general purpose computing device such as a personal computer (PC), a server computer, or a PC in communication with a server computer, and is provided with software that enables it to process and facilitate purchases being made by customers at the POS terminal 28.

In operation, a customer's goods or services will be processed, typically by a clerk, using the POS terminal 28. When it comes time to pay for the goods, the POS terminal 28 determines the final monetary amount required for the purchase. If the customer desires to pay using a payment card, the POS terminal 28 instructs the customer to swipe his or her card at the secure CAT 20 to enable the secure CAT 20 to acquire the full payment card account number, cardholder name and card expiration date from the customer's payment card. The POS terminal 28 also sends an instruction to the secure CAT 20 (in clear text form) instructing it to do an authorization transaction for the determined monetary value using the obtained payment card information. The payment processing for the traction then proceeds as described above in connection with FIG. 1. During that processing, no sensitive customer information, such as the obtained payment card information, is ever transmitted from the secure CAT 20 to the POS terminal 28. As a result, the POS terminal 28 does not need to comply with the PCI-DSS requirements. In other words, the POS terminal 28 and the POS computer system 30 are outside of the scope of the PCI-DSS requirements, and only the secure CAT 20 is inside the scope of the PCI-DSS requirements.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. For example, while the present invention has, in one embodiment, been described in connection with a postal services kiosk, other types of vending kiosks may make use of the present invention. In addition, the invention is not limited to use of a secure CAT coupled to a kiosk or POS terminal, but instead may be applied to a secure CAT coupled to any type of computerized sales transaction device that is able to generate a monetary amount required for the purchase of particular goods or services and transmit that information to the secure CAT. A vending kiosk and a POS terminal are just two examples of such computerized sales transaction devices. Accordingly, the invention is not to be considered as limited by the foregoing description but is only limited by the scope of the appended claims.

What is claimed is:

1. An apparatus for facilitating payment for goods or services using a payment card, comprising:
    a computerized sales transaction device structured to determine a monetary amount for a sale of goods or services, the computerized sales transaction device not meeting Payment Card Industry Data Security Standards requirements relating to security of payment card information; and
    a secure card activated terminal device in electronic communication with the computerized sales transaction device, the secure card activated terminal device meeting Payment Card Industry Data Security Standards requirements relating to security of payment card information;
    wherein the computerized sales transaction device is structured to electronically send the monetary amount for the sale to the secure card activated terminal device, wherein the secure card activated terminal device is structured to: (i) securely read sensitive payment card information from the payment card, (ii) responsive to receiving the determined monetary amount and the read sensitive payment card information, automatically request in a secure manner authorization for the sale from a third party using the determined monetary amount and the obtained sensitive payment card information, (iii) receive in a secure manner authorization approval for the sale from the third party, and (iv) in response to receiving the authorization approval, electronically send purchase authorization approval information to the computerized sales transaction device, and wherein the computerized sales transaction device never receives the sensitive payment card information.

2. The apparatus according to claim 1, wherein the sensitive payment card information includes a full account number, a cardholder name and a card expiration date associated with the payment card.

3. The apparatus according to claim 1, wherein the payment card is a credit card or a debit card.

4. The apparatus according to claim 1, wherein the computerized sales transaction device is a vending kiosk.

5. The apparatus according to claim 4, wherein the vending kiosk is a postal kiosk.

6. The apparatus according to claim 1, wherein the computerized sales transaction device is a POS terminal.

7. The apparatus according to claim 1, wherein the purchase authorization approval information includes an authorization number for the sale.

8. The apparatus according to claim 7, wherein the purchase authorization approval information further includes a last four digits of a full account number associated with the payment card.

9. A method of facilitating payment for goods or services using a payment card, comprising:
    determining a monetary amount for a sale of goods or services in a first device, the first device not meeting Payment Card Industry Data Security Standards requirements relating to security of payment card information;
    electronically sending the monetary amount for the sale to a secure card activated terminal device coupled to the first device, the secure card activated terminal device meeting Payment Card Industry Data Security Standards requirements relating to security of payment card information;
    securely reading, by the secure card activated terminal device, sensitive payment card information from the payment card;
    responsive to receiving the determined monetary amount and the read sensitive payment card information, automatically requesting by the secure card activated terminal device in a secure manner authorization for the sale from a third party using the determined monetary amount and the read sensitive payment card information;
    receiving in the secure card activated terminal device in a secure manner authorization approval for the sale from the third party; and in response to receiving the authorization approval, electronically send purchase authorization approval information from the secure card activated terminal device to the first device, wherein the first device never receives the sensitive payment card information.

10. The method according to claim 9, wherein the sensitive payment card information includes a full account number, a cardholder name and a card expiration date associated with the payment card.

11. The method according to claim 9, wherein the payment card is a credit card or a debit card.

12. The method according to claim 9, wherein the first device is a vending kiosk.

13. The method according to claim 12, wherein the vending kiosk is a postal kiosk.

14. The method according to claim 9, wherein the first device is a POS terminal.

15. The method according to claim 9, wherein the purchase authorization approval information includes an authorization number for the sale.

16. The method according to claim 15, wherein the purchase authorization approval information further includes a last four digits of a full account number associated with the payment card.

* * * * *